(12) United States Patent
Chen et al.

(10) Patent No.: US 7,380,138 B2
(45) Date of Patent: May 27, 2008

(54) CRYPTOGRAPHIC METHOD AND APPARATUS

(75) Inventors: Liqun Chen, Bristol (GB); Keith Alexander Harrison, Monmouthshire (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 793 days.

(21) Appl. No.: 10/831,350

(22) Filed: Apr. 22, 2004

(65) Prior Publication Data

US 2005/0005106 A1 Jan. 6, 2005

(30) Foreign Application Priority Data

Apr. 23, 2003 (GB) ................................. 0309161.8
May 22, 2003 (GB) ................................. 0311730.6

(51) Int. Cl.
*G06F 1/24* (2006.01)

(52) U.S. Cl. ....................... 713/193; 713/159; 713/168; 713/171; 713/172; 380/259; 380/278; 380/281; 380/283

(58) Field of Classification Search ................ 713/193, 713/159, 168, 171, 172; 380/259, 278, 281, 380/283
See application file for complete search history.

(56) References Cited

U.S. PATENT DOCUMENTS

| | | | |
|---|---|---|---|
| 4,926,480 A | 5/1990 | Chaum ........................ | 705/69 |
| 5,436,972 A | 7/1995 | Fischer ....................... | 380/286 |
| 6,446,205 B1 | 9/2002 | Lenstra ....................... | 713/168 |
| 7,103,911 B2 | 9/2006 | Spies et al. .................... | 726/3 |
| 7,113,594 B2 | 9/2006 | Boneh et al. .................. | 380/28 |
| 2002/0164026 A1 | 11/2002 | Huima ....................... | 380/247 |
| 2003/0081785 A1 | 5/2003 | Boneh et al. ................ | 380/277 |
| 2004/0019779 A1 | 1/2004 | Harrison et al. ............ | 713/150 |

FOREIGN PATENT DOCUMENTS

| | | |
|---|---|---|
| EP | 0 891 053 A2 | 1/1999 |
| EP | 1 392 018 A1 | 2/2004 |
| GB | 2 370 471 A | 6/2002 |
| GB | 2 391 139 A | 1/2004 |
| GB | 2 395 872 A | 6/2004 |
| WO | WO 03/017559 A2 | 2/2003 |

(Continued)

OTHER PUBLICATIONS

*The HP Time Vault Service: Innovating the Way Confidential Information is Disclosed, at the Right Time*, Hewlett-Packard Company, accessed via Internet at http://www.hpl.hp.com/research/tsl/external%20publications/tech%20reports/HPL-2002-243.pdf (2002).

(Continued)

*Primary Examiner*—Thomas R. Peeso
(74) *Attorney, Agent, or Firm*—Ladas & Parry, LLP

(57) ABSTRACT

First data to be sent by a first party to a second party is encrypted using an encryption key that is formed using at least a hash value generated by a keyed hash of at least one condition that typically serves as an identifier of an intended recipient of the first data. The encrypted first data is provided to a data recipient who requests a decryption key from the trusted party. The trusted party is responsible for verifying that the recipient meets the specified conditions before providing the decryption key. A valid decryption key is only provided if the correct conditions have been supplied to the trusted party.

5 Claims, 2 Drawing Sheets

FOREIGN PATENT DOCUMENTS

WO     WO 2004/047352 A2     9/2004

OTHER PUBLICATIONS

Shamir, A., "Identity-Based Cryptosystems and Signature Schemes," *Advances in Cryptology—CRYPTO '84, Lecture Notes in Computer Science*, vol. 196, pp. 47-53 (1985).

Boneh, D. and M. Franklin, "Identity-Based Encryption from the Weil Pairing," *Advances in Cryptology—CRYPTO 2001*, LNCS 2139, pp. 213-229, Springer-Verlag (2001).

Boneh, D., et al., "Identity-Based Mediated RSA," *3rd Workshop on Information Security Application*, Jeju Island, Korea, 12 pages (Aug. 2002).

Cocks, C., "An Identity Based Encryption Scheme Based on Quadratic Residues," *Proceedings of the 8th IMA International Conference on Cryptography and Coding*, LNCS 2260, pp. 360-363, Springer-Verlag (2001).

U.S. Appl. No. 10/831,548, filed Apr. 22, 2004, Chen et al.

U.S. Appl. No. 10/831,549, filed Apr. 22, 2004, Chen et al.

U.S. Appl. No. 10/831,776, filed Apr. 22, 2004, Chen et al.

Levy, I., "An Overview of Identifier-Based Public Key Cryptography," *Internet and Wireless Security*, pp. 121-131 (2002).

http:www.hpl.hp.com/techreports/2003/HPL-2003-18.pdf (2003).

Microsoft ComputerDictionary, Fifth Edition Excerpt http://www.proquest.safaribooksonline.com/0735614954/ch04 (May 1, 2002).

CRYPTOGRAPHIC METHOD AND APPARATUS

CROSS REFERENCE TO RELATED APPLICATIONS

This application is related to the following US patent applications filed by the assignee of the present application: U.S. Ser. No. 10/831,776 entitled "Cryptographic Method and Apparatus" filed 22 Apr. 2004; U.S. Ser. No. 10/831,549 entitled "Cryptographic Method and Apparatus" filed 22 Apr. 2004; and U.S. Ser. No. 10/831,548 entitled "Cryptographic Method and System" filed 22 Apr. 2004.

FIELD OF THE INVENTION

The present invention relates to cryptographic methods and apparatuses.

BACKGROUND OF THE INVENTION

Identifier-Based Encryption (IBE) is an emerging cryptographic schema. In this schema (see FIG. 1 of the accompanying drawings), a data provider 10 encrypts payload data 13 using both an encryption key string 14, and public data 15 provided by a trusted authority 12. This public data 15 is derived by the trusted authority 12 using private data 17 and a one-way function 18. The data provider 10 then provides the encrypted payload data <13> to a recipient 11 who decrypts it using a decryption key computed by the trusted authority 12 based on the encryption key string and its own private data.

A feature of identifier-based encryption is that because the decryption key is generated from the encryption key string, its generation can be postponed until needed for decryption.

Another feature of identifier-based encryption is that the encryption key string is cryptographically unconstrained though it is usually used to specify conditions serving to "identify" the intended message recipient and this has given rise to the use of the label "identifier-based" or "identity-based" generally for cryptographic methods of this type.

To ensure that the conditions are met before a recipient can read the payload data 13, the trusted authority 12 is arranged only to provide the decryption key to the recipient 11 (over a secure channel) if satisfied that the conditions included in the encryption key are met.

The foregoing encryption-decryption method exhibits a number of potential drawbacks.

More particularly, the conditions are transmitted in clear which may be undesirable particularly where the conditions are identifiers of the intended data receiver. In certain circumstances, it is better for the conditions not to be included in the encryption key but to be provide by the data receiver to the trusted authority. However, this runs the risk of the data receiver modifying the conditions.

It is an object of the present invention to provide improved cryptographic methods and apparatuses.

SUMMARY OF THE INVENTION

According to one aspect of the present invention, there is provided a data encryption method comprising encrypting first data using a symmetric-key encryption process and a symmetric key generated using a keyed hash of at least one condition that serves as an identifier of an intended recipient of the first data, the key used in the keyed hash being a secret shared with a trusted party.

According to another aspect of the present invention, there is provided a data transfer method comprising:

(a) encrypting first data at a first party using a symmetric-key encryption process and a symmetric key generated using a keyed hash of at least one condition that serves as an identifier of an intended recipient of the first data, the key used in the keyed hash being a secret shared with a trusted party
(b) sending the encrypted first data to a second party;
(c) providing said at least one condition to the trusted party;
(d) at the trusted party carrying out at least one check comprising a check that the or each said at least one condition is met by the second party;
(e) where said at least one check is satisfactory, providing a decryption key to the second party, this decryption key being generated by the trusted party using said shared secret and the at least one condition.

The present invention also encompasses apparatus for carrying out the encryption method of the invention, and a computer program product for conditioning programmable apparatus for carrying out the encryption method.

BRIEF DESCRIPTION OF THE DRAWINGS

An embodiment of the invention will now be described, by way of non-limiting example, with reference to the accompanying diagrammatic drawings, in which.

BEST MODE OF CARRYING OUT THE INVENTION

Figure 1:
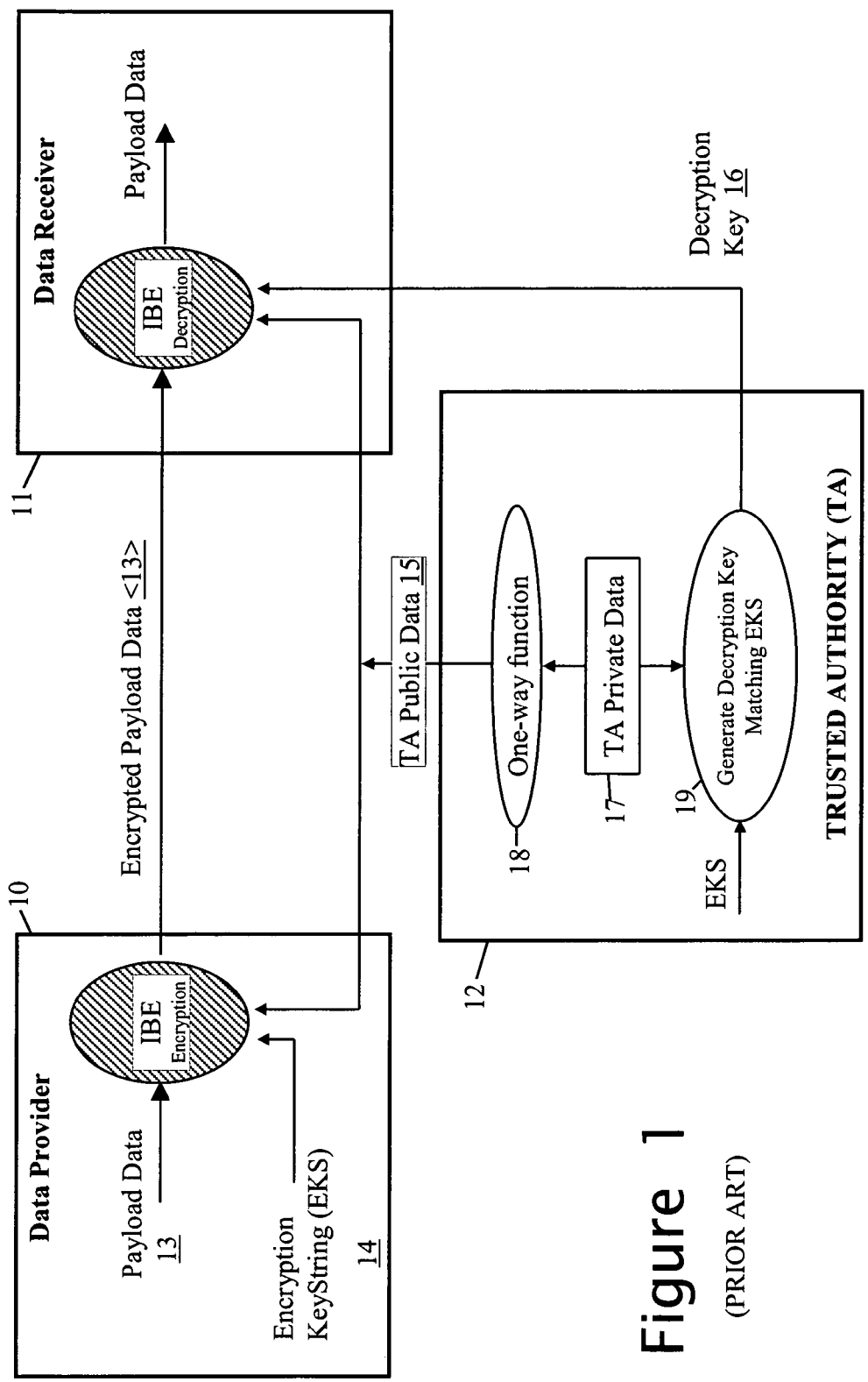
FIG. 1 is a diagram illustrating the operation of a prior art encryption schema known as Identifier-Based Encryption.
Figure 2:
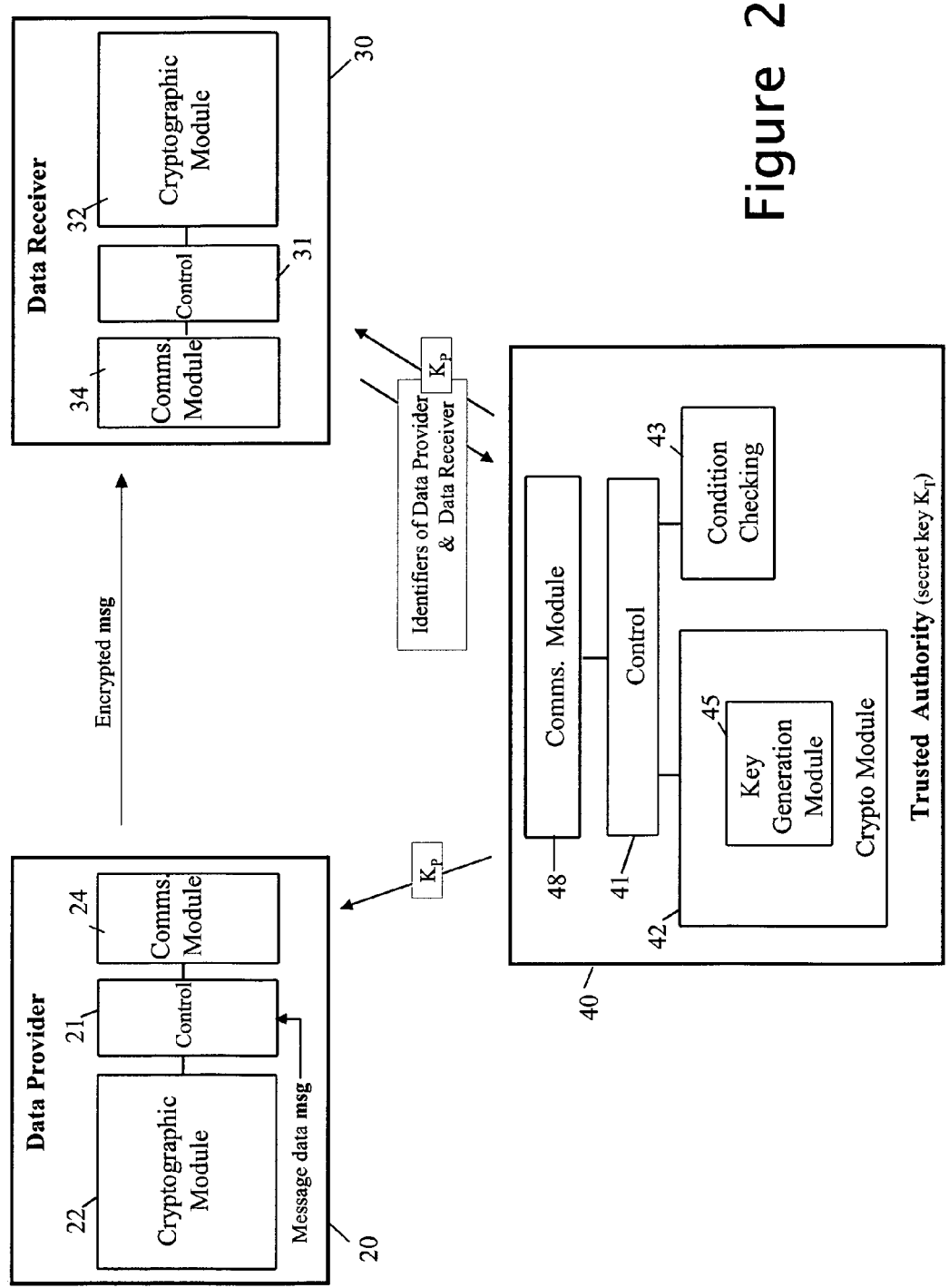
FIG. 2 is a diagram of a system embodying the present invention.

FIG. 1 illustrates a system embodying the present invention, the system comprising a first computing entity 20 associated with a data provider party; a second computing entity 30 associated with a data receiver party; and a third computing entity 40 associated with a trusted authority. The computing entities 20, 30 and 40 are typically based around general-purpose processors executing stored programs but may include dedicated cryptographic hardware modules. The computing entities 20, 30 and 40 inter-communicate as needed (see arrows 50-53) via, for example, the internet or other network, though it is also possible that at least some of the entities actually reside on the same computing platform.

In the following, references to the data provider, data receiver and the trusted authority are generally used interchangeably with references to their respective computing entities 20, 30 and 40.

In functional terms, the data-provider entity 20 comprises a communications module 24 for communicating with the entities 30 and 40, a control module 21 for controlling the general operation of the entity 20, and a cryptographic module 22 for executing certain cryptographic functions comprising a hash function, a symmetric-key generation function (that makes use of the hash function), and a symmetric-key encryption function.

The data-receiver entity 30 comprises a communications module 34 for communicating with the entities 20 and 40, a control module 31 for controlling the general operation of the entity 30, and a cryptographic module 32 for executing certain cryptographic functions comprising a symmetric-key decryption function.

The trusted authority entity 40 comprises a communications module 48 for communicating with the entities 20 and 30, a control module 41 for controlling the general operation of the entity 40, a cryptographic module 42 for executing certain cryptographic functions, and a condition checking module 43. The cryptographic module 42 is arranged to implement a hash function (the same as that used by the entity 20) and includes a unit 45 for generating a symmetric key.

The hash function implemented by the cryptographic modules 22 and 42 of the data provider entity 20 and the trusted authority entity 40 respectively is a keyed hash such as HMAC.

Consider the situation where the data provider 20 wishes to encrypt message data ("msg") for sending over an unprotected communications path for receipt and decryption by a recipient that meets a Condition 1 (that is, Condition 1 serves as an identifier of the intended recipient—in the present example, this is the data receiver 30).

The trusted authority 40 has a secret key $K_T$ which it uses to generate a secret key $K_P$ for the data provider 20 (the subscript "p" here standing for the data Provider):

$K_P$=HMAC($K_T$, identifier of data provider)

This enables the data provider 20 to use its cryptographic module 22 to generate a symmetric key $K_{PR}$:

$K_{PR}$=HMAC($K_P$, identifier of data receiver)

where the identifier of the data receiver is the Condition 1. The key $K_{PR}$ is then used with a symmetric encryption algorithm to encrypt the message data msg which the data provider 20 then sends, along with its identifier, to the data receiver 30. In order for the data receiver to obtain the key $K_{PR}$ for decrypting the message data msg, it must provide its identifier (Condition 1) and that of the data provider to the trusted authority 40 who can now use its cryptographic unit 42 to compute the key $K_{PR}$ as it either already knows $K_P$ (having previously computed it and stored it) or can re-compute it. Assuming that the data receiver 30 meets the Condition 1 (this is checked by the condition checking module 43 of the trusted authority 40), the trusted authority 40 then returns the key $K_{PR}$ to the data receiver 30 to enable the latter to use its cryptographic module 32 to decrypt the encrypted message data msg.

If the data receiver 30 supplies a modified Condition 1 to the trusted authority 40, the resultant key will not decrypt the encrypted message data.

By also sending a hash of the key $K_{PR}$, the data provider 30 can provide assurance to the trusted authority that $K_{PR}$ has been created by the data provider.

The invention claimed is:

1. A data encryption method comprising encrypting first data using a symmetric-key encryption process and a symmetric key generated using a keyed hash of at least one condition that serves as an identifier of an intended recipient of the first data, the key used in the keyed hash being a secret shared with a trusted party.

2. A data transfer method comprising:
   (a) encrypting first data at a first party using a symmetric-key encryption process and a symmetric key generated using a keyed hash of at least one condition that serves as an identifier of an intended recipient of the first data, the key used in the keyed hash being a secret shared with a trusted party;
   (b) sending the encrypted first data to a second party;
   (c) providing said at least one condition to the trusted party;
   (d) at the trusted party carrying out at least one check comprising a check that the or each said at least one condition is met by the second party;
   (e) where said at least one check is satisfactory, providing a decryption key to the second party, this decryption key being generated by the trusted party using said shared secret and the at least one condition.

3. A method according to claim 2, wherein in step (c) said at least one condition is provided to the trusted party by the second party.

4. Apparatus for encrypting first data comprising:
   a keyed-hash arrangement for generating a symmetric key by a keyed hash of at least one condition that serves as an identifier of an intended recipient of the first data, the key used in the keyed hash being a secret shared with a trusted party; and
   an encryption arrangement for encrypting the first data using a symmetric-key encryption process and said symmetric key.

5. A computer program product for conditioning programmable apparatus to provide:
   a keyed-hash arrangement for generating a symmetric key by a keyed hash of at least one condition that serves as an identifier of an intended recipient of the first data, the key used in the keyed hash being a secret shared with a trusted party; and
   an encryption arrangement for encrypting the first data using a symmetric-key encryption process and said symmetric key.

\* \* \* \* \*